United States Patent
Hains et al.

(10) Patent No.: US 9,175,810 B2
(45) Date of Patent: Nov. 3, 2015

(54) CUSTODY TRANSFER SYSTEM AND METHOD FOR GAS FUEL

(75) Inventors: John Victor Hains, Simpsonville, SC (US); John Francis Wodecki, Greenville, SC (US); Brian Michael Gallagher, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 621 days.

(21) Appl. No.: 13/464,792

(22) Filed: May 4, 2012

(65) Prior Publication Data

US 2013/0291971 A1 Nov. 7, 2013

(51) Int. Cl.
| | |
|---|---|
| F17D 3/00 | (2006.01) |
| G01F 25/00 | (2006.01) |
| G01F 5/00 | (2006.01) |
| G01F 15/00 | (2006.01) |
| G01F 15/02 | (2006.01) |
| G01F 15/04 | (2006.01) |
| G01F 15/06 | (2006.01) |

(52) U.S. Cl.
CPC .. *F17D 3/00* (2013.01); *G01F 5/00* (2013.01); *G01F 15/00* (2013.01); *G01F 15/024* (2013.01); *G01F 15/046* (2013.01); *G01F 15/063* (2013.01); *G01F 25/0007* (2013.01); *Y10T 137/0324* (2015.04); *Y10T 137/85986* (2015.04)

(58) Field of Classification Search
CPC ......... F17D 3/01; G01F 25/0007; G01F 5/00; G01F 15/00; G01F 15/046; G01F 15/063; G01F 7/00; G01F 15/024
USPC ................... 700/282; 137/2, 565.11; 123/511
See application file for complete search history.

(56) References Cited

U.S. PATENT DOCUMENTS

| | | | | |
|---|---|---|---|---|
| 2,958,218 | A | * 11/1960 | Hill | ................................ 73/1.27 |
| 3,010,317 | A | 11/1961 | Scott et al. | |
| 3,287,972 | A | 11/1966 | Hughes | |
| 3,866,109 | A | * 2/1975 | Reed et al. | ....................... 322/15 |
| 3,875,380 | A | * 4/1975 | Rankin | ........................... 700/69 |
| 3,979,904 | A | * 9/1976 | Hobbs | ............................. 60/790 |
| 4,007,754 | A | * 2/1977 | Beck et al. | ........................ 137/2 |

(Continued)

OTHER PUBLICATIONS

Astleford & Johnson,"Accurate Measurement of Natural Gas Consumption: The Economic Impact on Power Generation Operations", Energy Conversion Engineering Conference, Proceedings of 32nd Intersociety, IEEE, 1997, vol. 3, pp. 1684-1689.*

(Continued)

*Primary Examiner* — Charles A Kasenge
(74) *Attorney, Agent, or Firm* — Fletcher Yoder, P.C.

(57) ABSTRACT

A system includes a custody transfer system configured to transfer a gas fuel from a gas supply to a plurality of gas turbines. The custody transfer system includes a first plurality of flow meters arranged in parallel with each other, wherein each of the first plurality of flow meters is configured to obtain a first measurement of a portion of a flow rate of the gas fuel flowing through the custody transfer system, and a second plurality of flow meters in series with the first plurality of flow meters, wherein each of the second plurality of flow meters is configured to obtain a second measurement of the flow rate of the gas fuel flowing through the custody transfer system, and wherein each of the first and second plurality of flow meters is configured to be blocked or unblocked from receiving the gas fuel based on a number of the plurality of gas turbines in operation.

20 Claims, 7 Drawing Sheets

(56) References Cited

U.S. PATENT DOCUMENTS

| | | | |
|---|---|---|---|
| 4,203,574 A * | 5/1980 | Minks | 251/129.21 |
| 4,308,463 A * | 12/1981 | Giras et al. | 290/40 R |
| 4,566,307 A | 1/1986 | Boykin | |
| 4,569,012 A * | 2/1986 | Sekozawa et al. | 700/44 |
| 4,586,126 A * | 4/1986 | Funk et al. | 700/67 |
| 4,819,183 A * | 4/1989 | O'Brien et al. | 700/282 |
| 5,095,221 A * | 3/1992 | Tyler | 290/40 C |
| 5,252,860 A * | 10/1993 | McCarty et al. | 290/40 R |
| 5,582,012 A | 12/1996 | Tunkel | |
| 6,155,051 A | 12/2000 | Williams | |
| 6,360,579 B1 * | 3/2002 | De Boom et al. | 73/1.35 |
| 6,439,253 B1 * | 8/2002 | Easton | 137/9 |
| 6,456,902 B1 * | 9/2002 | Streetman | 700/282 |
| 6,502,466 B1 * | 1/2003 | Cage et al. | 73/861.355 |
| 6,655,151 B2 * | 12/2003 | Mahoney et al. | 60/773 |
| 6,751,942 B2 * | 6/2004 | Mahoney et al. | 60/39.281 |
| 6,820,631 B2 * | 11/2004 | Lehnst et al. | 137/2 |
| 6,857,447 B2 * | 2/2005 | Olander et al. | 137/240 |
| 7,028,528 B2 * | 4/2006 | Antonijevic | 73/1.16 |
| 7,082,354 B2 * | 7/2006 | Watanabe | 700/282 |
| 7,177,725 B2 * | 2/2007 | Nortier et al. | 700/282 |
| 7,189,574 B2 | 3/2007 | Owen | |
| 7,231,931 B2 * | 6/2007 | Lull et al. | 137/2 |
| 7,343,775 B2 * | 3/2008 | Cunningham et al. | 73/1.06 |
| 7,457,688 B2 * | 11/2008 | Szepek et al. | 700/287 |
| 7,513,150 B2 * | 4/2009 | Parris et al. | 73/276 |
| 7,974,741 B2 * | 7/2011 | Watson | 700/282 |
| 7,979,165 B2 * | 7/2011 | Gotoh et al. | 700/282 |
| 8,099,942 B2 * | 1/2012 | Alexander et al. | 60/39.463 |
| 8,131,400 B2 * | 3/2012 | Smirnov | 700/282 |
| 8,175,754 B2 * | 5/2012 | Wiklund | 700/281 |
| 8,265,794 B2 * | 9/2012 | Minervini et al. | 700/282 |
| 8,265,795 B2 * | 9/2012 | Takahashi et al. | 700/282 |
| 8,463,446 B2 * | 6/2013 | Borgmann et al. | 700/282 |
| 8,483,884 B1 * | 7/2013 | Williams | 700/282 |
| 8,489,244 B2 * | 7/2013 | Cao et al. | 700/282 |
| 8,594,851 B1 * | 11/2013 | Smaidris | 700/282 |
| 8,615,329 B2 * | 12/2013 | O'Connor | 700/282 |
| 2001/0015222 A1 * | 8/2001 | Lewit et al. | 137/2 |
| 2008/0289691 A1 * | 11/2008 | Roberge et al. | 137/2 |
| 2008/0295568 A1 * | 12/2008 | Nanaji et al. | 73/1.34 |
| 2009/0187356 A1 * | 7/2009 | Artiuch | 702/45 |
| 2010/0023170 A1 * | 1/2010 | Sherwood | 700/282 |
| 2010/0223976 A1 | 9/2010 | Jakubenas | |
| 2011/0082580 A1 * | 4/2011 | Philippe et al. | 700/108 |
| 2011/0130882 A1 * | 6/2011 | Perez | 700/282 |
| 2012/0158192 A1 * | 6/2012 | Sherwood | 700/282 |
| 2013/0333373 A1 * | 12/2013 | Fong et al. | 60/509 |

OTHER PUBLICATIONS

Stappert, Karl, "Application and Verification of Coriolis Meters for Gas Measurement", American School of Gas Measurement Technology, Jan. 12, 2007: http://asgmt.com/paper/2007/page/5.*

U.S. Appl. No. 13/344,833, filed Jan. 6, 2012, John Victor Hains.

* cited by examiner

FIG. 8

CUSTODY TRANSFER SYSTEM AND METHOD FOR GAS FUEL

BACKGROUND OF THE INVENTION

The subject matter disclosed herein relates to custody transfer of fluids (e.g., gas or liquid) from one entity to another entity. In particular, the disclosed subject matter relates to measurements of fuels (e.g., natural gas) delivered from a supplier to a recipient.

A variety of systems, such as gas turbine systems, are powered by fuel, such as natural gas. The natural gas is often times provided by one entity (e.g., a supplier) to another entity (e.g., a recipient) via a custody transfer system. The amount of natural gas that is transferred between these operators is useful in determining amounts of gas consumed by the recipient and/or billing amounts to be charged by the supplier. A high level of accuracy is desirable in these custody transfer systems. Unfortunately, existing custody transfer systems use large flow meters that may be less accurate at low flow rates. Furthermore, existing custody transfer systems may require periodic maintenance and/or calibration of flow meters in an offline state (e.g., natural gas flow is shut down). This offline maintenance and/or calibration may be costly and inconvenient due to the loss of natural gas flow.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system comprises a custody transfer system configured to transfer a gas fuel from a gas supply to a plurality of gas turbines. The custody transfer system includes a first plurality of flow meters arranged in parallel with each other, wherein each of the first plurality of flow meters is configured to obtain a first measurement of a portion of a flow rate of the gas fuel flowing through the custody transfer system, and a second plurality of flow meters in series with the first plurality of flow meters, wherein each of the second plurality of flow meters is configured to obtain a second measurement of the flow rate of the gas fuel flowing through the custody transfer system, and wherein each of the first and second plurality of flow meters is configured to be blocked or unblocked from receiving the gas fuel based on a number of the plurality of gas turbines in operation.

In a second embodiment, a system comprises a custody transfer system configured to supply a gas fuel to a plurality of gas turbines. The custody transfer system includes a first plurality of flow meters configured to flow the gas fuel, each of the first plurality of flow meters having a respective selection valve configured to regulate flow of the gas fuel through the respective flow meter, wherein the first plurality of flow meters are arranged in parallel with one another. The custody transfer system also includes a second plurality of flow meters configured to flow a gas fuel, each of the second plurality of flow meters having a respective selection valve configured to regulate flow of the gas fuel through the respective flow meter, wherein the second plurality of flow meters are arranged in parallel with one another and the first plurality and second plurality of flow meters are arranged in series with one another. The custody transfer system further includes a flow computer configured to operate the selection valves of the first and second pluralities of flow meters based upon a number of the plurality of gas turbines in operation.

In a third embodiment, a method includes regulating, via a computer, flow of a gas fuel through a first plurality of flow meters of a custody transfer system based upon a number of gas turbines in operation, wherein the first plurality of flow meters are arranged in parallel with one another, and regulating, via the computer, flow of the gas fuel through a second plurality of flow meters of the custody transfer system based upon the number of gas turbines in operation, wherein the second plurality of flow meters are arranged in parallel with one another, and the first plurality of flow meters and the second plurality of flow meters are arranged in series with each other.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevetheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments relate to enhanced accuracy and operability in custody transfer of natural gas from a supplier to recipient through use of a custody transfer skid including multiple flow meters operating in parallel. More specifically, the disclosed custody transfer skids may be configured to flow natural gas to one or more gas turbines. That is, the usage of the multiple flow meters of the custody transfer skid may be adjusted or customized based on the number of gas turbines in operation at a given time. Additionally, one or more additional flow meters may be in series with the parallel flow meters. The disclosed embodiments may enable more accurate measurements of natural gas flow in different gas flow conditions. Further, as flow meters in the skid are taken offline for maintenance and/or calibration, transfer operations may continue without an operational shutdown. Thus, the disclosed embodiments increase the accuracy of natural gas flow measurements as well as decrease the amount of downtime caused by custody transfer meter maintenance and/or calibration.

Figure 1:
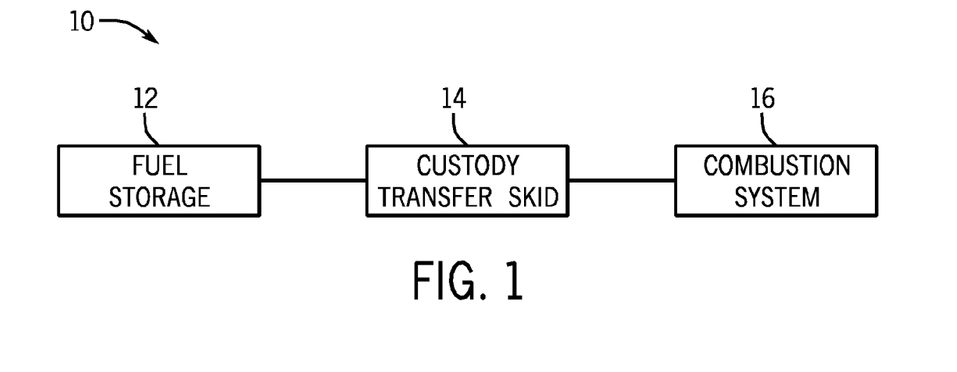
FIG. 1 is a block diagram of a gas turbine system with a custody transfer skid in accordance with an embodiment.

With the foregoing in mind, FIG. 1 is a block diagram of a gas turbine system 10 with a custody transfer skid 14, in accordance with an embodiment. The turbine system 10 includes a fuel storage 12 (e.g., gas storage), a custody transfer skid 14, and a combustion system 16. The combustion system 16 may be any combustion system, such as a combustion driven electrical generator. For simplicity of discussion, the combustion system 16 will be exemplified as a gas turbine 16, however, any combustion system 16 may be used. The fuel storage 12 may include one or more fuel tanks, supply pipe lines, and/or tanker trucks that store fuel, such as natural gas, useful for powering the gas turbine 16. The fuel may be any liquid or gaseous fuel. For simplicity of discussion, the fuel discussed below will be exemplified as natural gas, however, any fuel may be used. The fuel (e.g., natural gas) from the fuel storage 12 is passed through the custody transfer skid 14 to the gas turbine 16. The gas turbine 16 then consumes the natural gas, causing the natural gas levels to gradually deplete in the fuel storage 12.

The custody transfer skid 14 may be useful in determining the amount of natural gas that is flowing from the gas storage 12 to the gas turbine 16. Such information may be useful in assessing billing amounts and/or gas consumption by the gas turbine 16. The gas storage 12 may be owned by a natural gas supplier while the gas turbine is owned and/or operated by a recipient. The custody transfer skid 14 may mark the point where the natural gas is sold by the supplier to the recipient, thus transferring custody of the natural gas. As may be appreciated, it may be very desirable to provide accurate measurements, such that the supplier is aware of how much natural gas they should bill for and the recipient is aware of how much natural gas they should pay for. Further, the measurements may be useful for determine consumption amounts and/or rates by the gas turbine 16.

Figure 2:
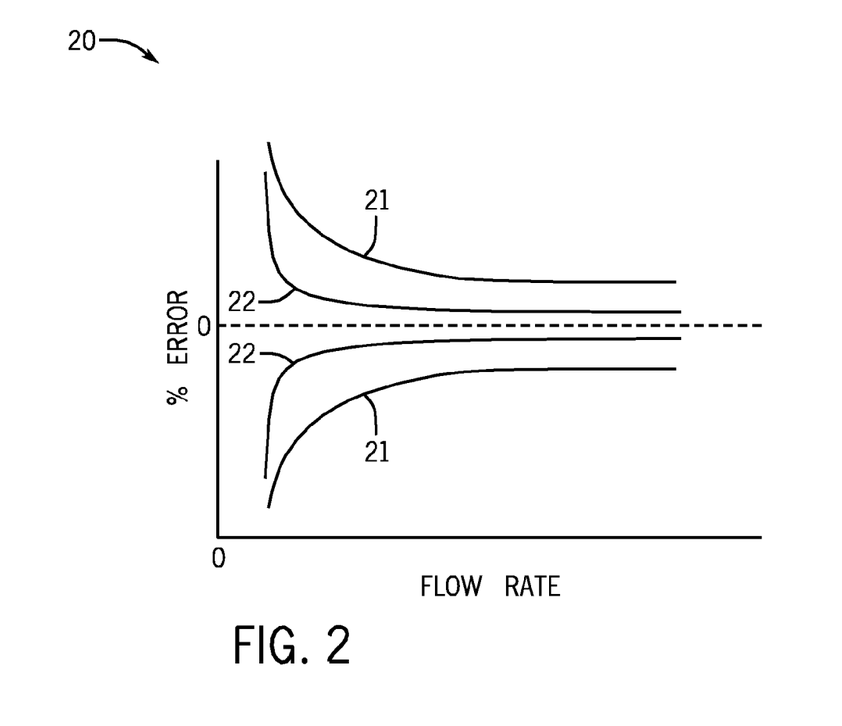
FIG. 2 is a chart depicting the error rates of smaller flow meters as compared to larger flow meters.

From time to time, gas flowing from the gas storage 12 may result in low flow situations. In low flow situations, flow meters in the custody transfer skid 14 may provide less accurate measurements. In such situations, the use of smaller flow meters may provide more accurate measurements than large flow meters. FIG. 2 is a chart 20 depicting the error rates of smaller flow meters as compared to larger flow meters under a variety of flow rates. Plot 21 illustrates the percentage of error associated with a large flow meter (e.g., 8 inch throat). Plot 22 illustrates the percentage of error associated with a smaller flow meter (e.g., 4 inch throat). As may be observed from the chart 20, as the flow rate increases, the accuracy of both the large and small flow meters increase. However, the smaller flow meter may provide more accurate results, especially in low flow situations. In one test case, a flow meter with a four inch throat yielded an approximate error percentage of 0.5% at a low flow rate. A flow meter with an eight inch throat yielded an approximate error percentage of 2.0% at the same low flow rate. Thus, the larger throated flow meter provided a significantly higher percentage of error in low flow conditions.

Figure 3:
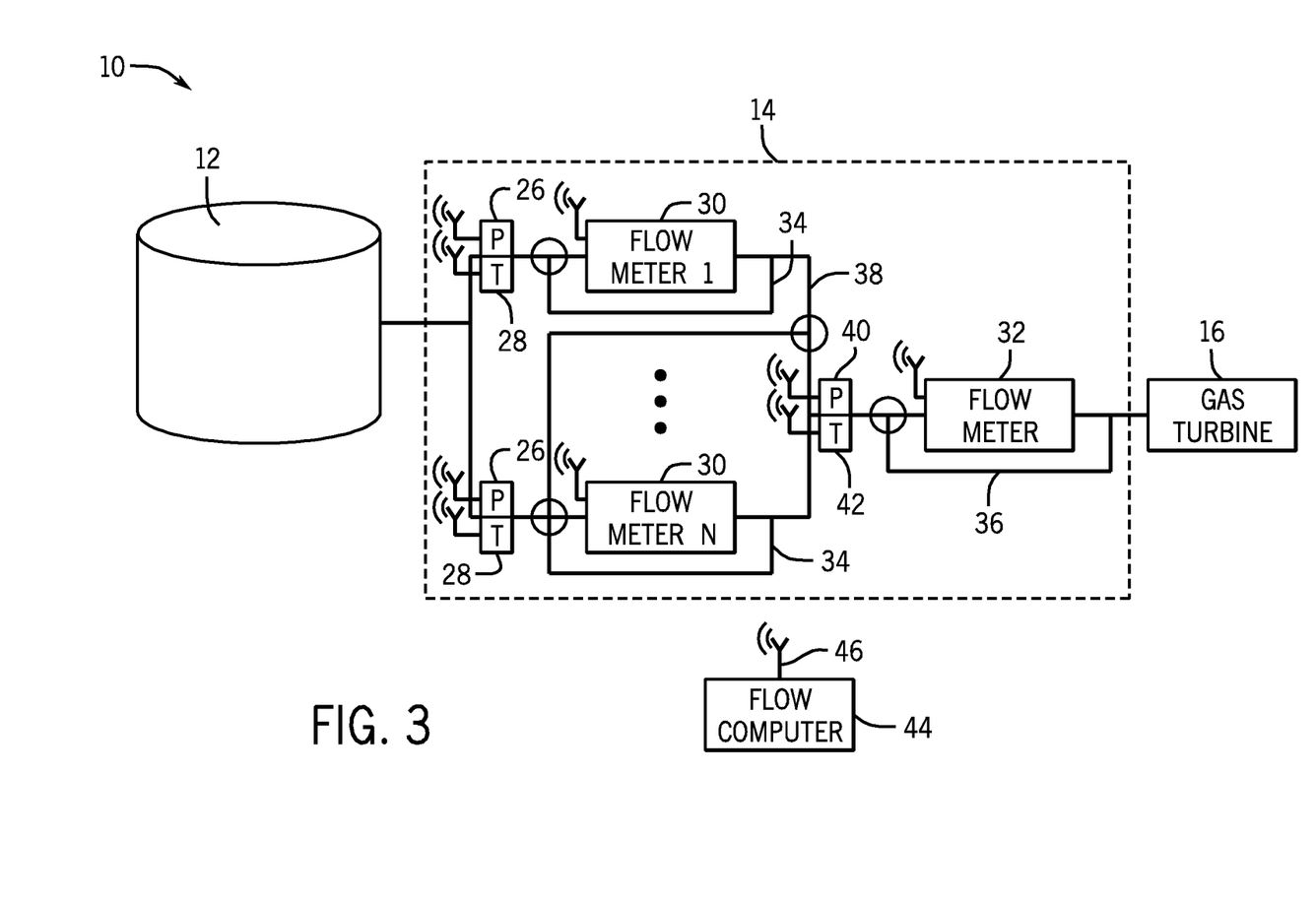
FIG. 3 is a schematic diagram of a gas turbine system with a custody transfer skid enabled with multiple small flow meters operating in parallel, in accordance with an embodiment.

To remedy the less accurate measurements provided by larger meters in low flow situations, multiple smaller flow meters may run in parallel. FIG. 3 is a schematic diagram of a gas turbine system 10 with a custody transfer skid 14 enabled with multiple small flow meters 30 operating in parallel, in accordance with an embodiment. As previously discussed, gas flowing from the gas storage 12 flows through the custody transfer skid 14 through to the gas turbine 16. The custody transfer skid 14 may measure the flow rates, temperatures, and/or pressure measurements of the gas flowing through the custody transfer skid 14. For example, the custody transfer skid 14 may include pressure transmitters 26 and 40, temperature transmitters 28 and 42, and flow meters 30 and 32. The pressure transmitters 26 and 40 along with the temperature transmitters 28 and 42 may be useful in determining a density of the gas supply, such that more accurate measurements may be taken. Further, some flow meters use pressure measurements in their flow calculations. To increase the accuracy of measurements, the pressure transmitters 26 and 40 and temperature transmitters 28 and 42 may be disposed directly upstream or downstream of the flow meters 30 and 32 within a short distance. The temperature, pressure, and/or flow measurements may be transmitted to a flow computer 44 via wired and/or wireless communications circuitry 46, such that the flow computer may use the data to determine the total amount of gas transferred through the custody transfer skid 14. Additionally, the custody transfer skid 14 may include rerouting pathways (e.g., bypass loops 34 and 36 and/or rerouting pathway 38).

Rather than providing one large flow meter for initial measurement of the inlet gas flow, multiple smaller flow meters 30 may be arranged in parallel to measure the flow rate. For example, in some embodiments, the number of smaller flow meters 30 may be 2 to 20 or more, e.g., 2, 3, 4, 5, 6, 7, 8, 9, or 10 parallel flow meters 30. The smaller flow meters 30 may include a summed capacity that is approximately equal to or greater than the capacity of a single large flow meter typically used for initial inlet gas flow measurement. For example, in certain embodiments, the capacity of each of the small flow meters 30 may be 1/N of the capacity of the large flow meter, where N is the number of small flow meters 30. Further, in certain embodiments, the small flow meters 30 may have a percentage of capacity less than the large flow meter.

Under normal operating conditions, the inlet gas supply may be routed to the plurality of small flow meters 30 with associated pressure transmitters 26 and temperature transmitters 28. Each of the pressure transmitters 26 and temperature transmitters 28 may transmit pressure and temperature measurements of the gas flowing through an associated small flow meter 30. Each small flow meter 30 may take flow measurements in parallel of gas flowing through the plurality of small flow meters 30. The flow measurements, temperature measurements, and/or pressure measurements may be transmitted to the flow computer 44 through the communications circuitry 46. As will be discussed in more detail below with regards to FIG. 4, the flow computer 44 may interpret the measurements to determine the total amount of gas flowing through the custody transfer skid 14.

After passing through the small meters 30, the gas may be consolidated and routed through a large flow meter 32, which may include an associated pressure transmitter 40 and/or temperature transmitter 42. The large flow meter 32 may provide a proving mechanism for the measurements taken from the smaller flow meters 30. Proving verifies the accuracy of a previously taken custody transfer measurement. Under some custody transfer regulations, a proving mechanism may be required in order to bill a recipient for transferred gas. The measurements from the large flow meter 32 and the associated pressure transmitter 40 and/or temperature transmitter 42 may be transmitted to the flow computer 44, which may interpret the measurement to prove the measurements provided by the smaller flow meters 30. After flowing through the large flow meter 32, the gas may be directed to the gas turbine 16 where it may be consumed.

The flow meters 30 and 32 may be similar or different. Each of the flow meters 30 and 32 may each be of a different size, type, manufacturer, etc. For example the flow meters 30 and 32 may be Coriolis meters, ultrasonic meters, turbine meters, Venturi meters, orifice meters, or a combination thereof. Further, each of the flow meters 30 may have varying maximum flow rates. However, the maximum flow rate of each of the flow meters 30, when summed, may be equal to the maximum flow rate of the large flow meter 32.

In certain situations, it may be desirable or necessary to remove one of the flow meters in the custody transfer skid 14. For example, from time to time, smaller flow meters 30 and/or large flow meter 32 may require maintenance and/or calibration. For example, due to industry regulation, flow meters may be subject to calibration once every year. Such calibration may involve removing the flow meter and shipping it to a lab where the calibration may occur. In situations where it is desirable to take one of the flow meters 30 or 32 offline, the rerouting pathways (e.g., bypass looks 34 and 36 and/or rerouting pathway 38) may be useful in enabling the gas to continue to flow through the custody transfer skid 14 despite one of the flow meters 30 or 32 being offline/removed.

In the illustrated embodiment, each of the smaller flow meters 30 includes a bypass loop 34. Further, the large flow meter 32 includes a bypass loop 36. The bypass loops 34 and 36 enable the flow meters 30 and 32 to be taken offline by rerouting the gas supply around the flow meters 30 and 32. Thus, if an operator desires to take a first flow meter 30 (e.g., meter 1) offline, the bypass loop 34 associated with flow meter 1 may be activated to reroute the gas supply upstream of the first flow meter 30. As previously discussed, certain custody transfer regulations may demand proving of flow meter accuracy in order to bill a recipient. In certain embodiments the large flow meter 32 may still be taken offline via bypass loop 36 such that the gas turbine 16 maintains a gas supply. However, in such a scenario, a proving flow meter may not be active, and thus billing during the time of inactivity may be limited.

In some embodiments, meter proving may be enabled without removing meters from the system 10. For example, the large flow meter 32 may be proved by the measurements of one of the flow meters 30. By comparing the flow readings of one of the flow meters 30 with the large flow meter 32, the accuracy of the flow meter 32 may be proved without removing the large flow meter 32 from the system 10.

Figure 4:
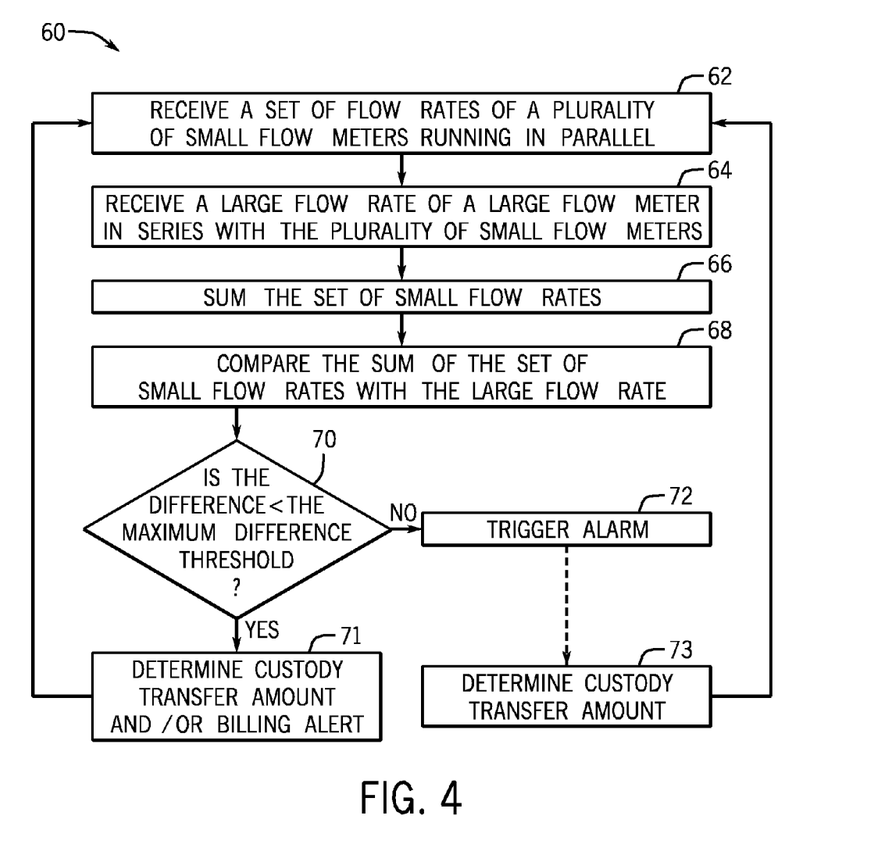
FIG. 4 is a flow chart depicting a process for measuring and proving custody transfer quantities in accordance with an embodiment.

As previously mentioned, a flow computer 44 may determine custody transfer quantities based upon measurements provided from the custody transfer skid 14. FIG. 4 is a flow chart depicting a process 60 for measuring and proving custody transfer quantities via the flow computer 44, in accordance with an embodiment. The flow computer 44 receives a set of flow rates from a plurality of small flow meters 30 running in parallel (block 62). Additionally, the flow computer 44 receives a large flow rate of a large flow meter 32 in series with the plurality of small flow meters 30 (block 64). The flow rates from the plurality of small flow meters 30 are summed (block 66). The flow computer compares the summed flow rates with the flow rate provided from the large flow meter 32 (block 68) to determine an accuracy of the summed flow rates and the flow rate provided from the large flow meter 32.

The flow computer may determine whether or not the difference between the summed flow rates and the flow rate provided from the large flow meter 32 is less than a maximum difference threshold (block 70). The maximum difference threshold is a threshold value that represents the maximum deviation between the measurements from the small flow meters 30 and the large flow meter 32. If the difference between the sum of flow rates from the small flow meters 30 and the flow rate from the large flow meter 32 is less than the maximum difference threshold, the flow computer may determine a confident custody transfer quantity and/or billing amount (block 71), as the proving flow meter (e.g., large flow meter 32) provided a custody transfer quantity within a threshold of deviation of the small flow meters 30. The determined custody transfer quantity may be based upon the summed flow measurements of the small flow meters 30, the flow measurements of the large flow meter 32, or a combination of both. For example, in some embodiments, the determination of the custody transfer quantity and the billing amount may be determined based upon an average taken between the summed flow measurements and the large flow measurement. In alternative embodiments, a weighted average may be useful in determining the custody transfer quantities, such that the measurements from either the summed flow measurements or the large measurement is given more credence. Further the flow computer 44 may determine a billing amount based upon the confident custody transfer quantity. The flow computer 44 may then cycle back to block 62 to obtain further measurements.

When the difference between the summed flow measurements from the small flow meters 30 and the flow rate from the large flow meter 32 is greater than or equal to the maximum difference threshold (or is less than or equal to a minimum accuracy threshold), an alarm may be triggered (block 72). The alarm may notify operators of problems with the custody transfer skid 14, such that remedial measures may be taken. For example, the alarm may alert the operator that the proving of the summed measurements cannot verify the accuracy of the summed measurements. Nonetheless, the flow computer 44 may determine a less-confident custody transfer amount (block 73). The determined custody transfer quantity may be based upon the summed flow measurements of the small flow meters 30, the flow measurements of the large flow meter 32, or a combination of both. For example, in some embodiments, the determination of the custody transfer quantity may be determined based upon an average taken between the summed flow measurements and the large flow measurement. In alternative embodiments, a weighted average may be useful in determining the custody transfer quantities, such that the measurements from either the summed flow measurements or the large measurement is given more credence. Further, in some embodiments the lower of the summed flow measurements from the small flow meters 30 and the large meter 32 may determine the less-confident custody transfer amount. Because the custody transfer quantity could not be proved within the maximum difference threshold, the flow computer 44 may be enabled to limit billing calculation based upon the less-confident custody transfer amount. In some embodiments, due to billing regulations, billing may be suspended until proving accuracy is restored. The flow computer 44 may the cycle back to block 62 to obtain further flow measurements.

FIGS. 5-8 are schematic diagrams of the gas turbine system 10 with the custody transfer skid 14 having multiple flow meters 100 operating in parallel and in series. More specifically, the custody transfer skids 14 shown in FIGS. 5-8 are configured to flow gas from the gas storage 12 to one gas turbine 16 or multiple (e.g., 2, 3, 4, 5, or more) gas turbines 16. As similarly discussed above, the custody transfer skid 14 has custody transfer flow meters 102 and proving flow meters 104. In the illustrated embodiments, the custody transfer skid 14 has three custody transfer meters 102 operating in parallel and two proving meters 104 operating in parallel. However, in other embodiments of the custody transfer skid 14, other numbers of custody transfer meters 102 and proving meters 104 may be used. Furthermore, the plurality of custody transfer meters 102 and the plurality of proving meters 104 are cumulatively coupled in series. In other words, gas flowing from the gas storage 12 to one or more of the gas turbines 16 first passes through one or more of the custody transfer meters 102 and subsequently passes through one or more of the proving meters 104. After the gas passes through the flow meters 100, the gas may pass through a gas outlet 105 of the custody transfer skid 14, and subsequently pass to one or more of the gas turbines 16.

As discussed in detail below, the disclosed embodiments enable the single custody transfer skid 14 to provide gas to multiple (e.g., 2, 3, 4, 5, or more) gas turbines 16, while still maintaining high accuracy of gas flow measurements. Additionally, the described design of the custody transfer skid 14 allows accurate measurements of gas flow rates even when changes in gas flow occur. As will be appreciated, the custody transfer skid 14 may flow different amounts of gas at different flow rates depending on the number of gas turbines 16 in operation. For example, the flow computer 44 may operate various selection valves 106 of the custody transfer skid 14 to regulate which flow meters 100 are used to flow the gas, based on the number of gas turbines 16 operating at a given time. Furthermore, the present design allows one or more flow meters 100 to be removed from the custody transfer skid 14 for maintenance, recalibration, replacement, or the like, without interrupting gas turbine 16 operation.

As similarly described above, the custody transfer skids 14 illustrated in FIGS. 5-8 include pressure transmitters 26 and 40 and temperature transmitters 28 and 42, which may be used to determine a density of the gas flow passing through the flow meters 100. Further, some flow meters 100 use pressure measurements in their flow calculations. To increase the accuracy of measurements, the pressure transmitters 26 and 40 and temperature transmitters 28 and 42 may be disposed directly upstream or downstream of the flow meters 100 (e.g., custody transfer meters 102 and proving meters 104) within a short distance. The temperature, pressure, and/or flow measurements may be transmitted to the flow computer 44 via the wired and/or wireless communications circuitry 46, such that the flow computer 44 may use the data to determine the total amount of gas transferred through the custody transfer skid 14. Additionally, the illustrated embodiments of the custody transfer skid 14 may include rerouting the bypass loops 34 and 36. As mentioned above, the bypass loops 34 and 36 enable the flow meters 100 to be removed from the custody transfer skid 14 for maintenance, recalibration, replacement, or the like, without interrupting gas turbine 16 operation. That is, when one of the flow meters 100 is removed from the custody transfer skid 14, the gas flow may either be redirected to flow through other flow meters 100, or the gas flow may pass through the respective bypass loop 34 or 26 associated with the removed flow meter 100.

As indicated in the illustrated embodiments, the flow meters 100 (e.g., the custody transfer meters 102 and the proving meters 104) may have varying sizes. In this manner, different flow meters 100 may be used depending on the number of gas turbines 16 operating at a given time. For example, of the three custody transfer meters 102 arranged in parallel in the illustrated embodiments, two custody transfer meters 102 may be small flow meters 108 and one custody transfer meter 102 may be a medium flow meter 110. In one embodiment, the small flow meters 108 may have an approximately 4 inch diameter, and the medium flow meter 110 may have an approximately 6 inch diameter. However, other embodiments may have small and medium flow meters 108 and 110 of different sizes. For example, the ratio of sizes of the small and medium flow meters 108 and 110 may be approximately 1:2, 2:3, 2:5, 3:5, and so forth.

Additionally, the proving meters 104 may have sizes different from the custody transfer meters 102 (e.g., the small flow meters 108 and the medium flow meter 110). In the illustrated embodiments, the proving meters are large flow meters 112. For example, in one embodiment, the large flow meters 112 may have a diameter of approximately 8 inches. However, other embodiments of the large flow meters 112 may have other sizes. For example, the ratio of sizes of the medium and large flow meters 110 and 112 may be approximately 1:2, 2:3, 2:5, 3:5, and so forth. As similarly discussed above, the small and medium flow meters 108 and 110 may have a summed capacity that is approximately equal to, less than, or greater than the summed capacity of the large flow meters 112.

Figure 5:
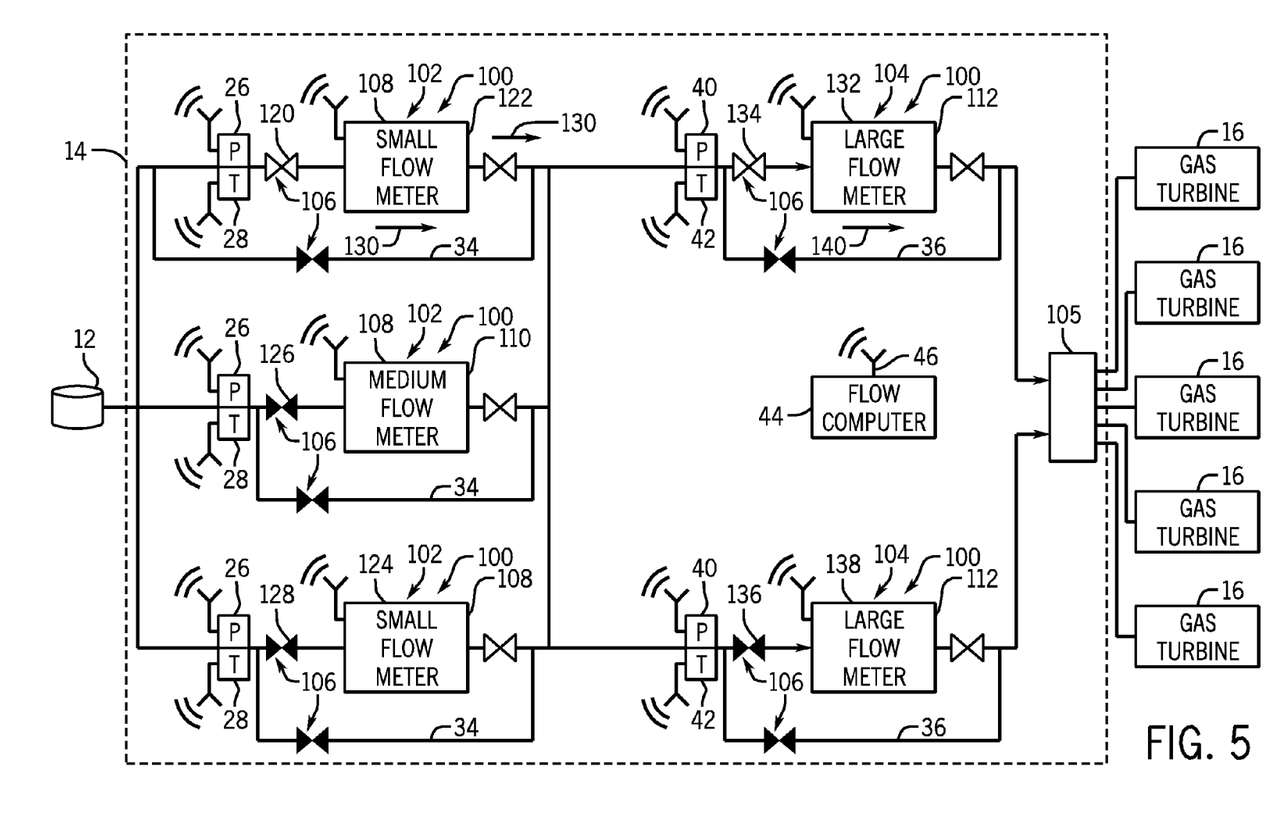
FIG. 5 is a schematic diagram of the gas turbine system with the custody transfer skid having multiple flow meters operating in parallel and in series, illustrating usage of the flow meters when one gas turbine is operating.

FIG. 5 is a schematic diagram of the gas turbine system 10 with the custody transfer skid 14 having multiple flow meters 100 operating in parallel and in series, illustrating usage of the flow meters 100 when one gas turbine 16 is operating. Specifically, certain selection valves 106 are closed to block gas flow to certain flow meters 100 of the custody transfer skid 14, while other selection valves 106 are open to allow other flow meters 100 to receive gas flow from the fuel storage 12. In this manner, the amount of gas flowing through the custody transfer skid 14 (e.g., gas flow rate) and the number of flow meters 100 used can be tailored or adjusted based on the number of gas turbines 16 in operation. As a result, the gas flow rate measurement accuracy of the flow meters 100 and the custody transfer skid 14 may be improved.

As mentioned above, when passing through the custody transfer skid 14 from the fuel storage 12 to the gas turbines 16, the gas first flows through one or more custody transfer meters 102 and then subsequently flows through one or more proving meters 104. In the illustrated embodiment, a selection valve 120 associated with a first small flow meter 122 (e.g., custody transfer meter 102) is in an open position. In other words, the selection valve 120, which is positioned upstream of the first small flow meter 122 and is configured to regulate the flow of gas through the first small flow meter 122, is open, thereby allowing gas to flow through the first small flow meter 122. Conversely, selection valves 106 associated with the medium flow meter 110 and a second flow meter 124 (e.g., custody transfer meters 102) are in a closed position. More specifically, a selection valve 126 positioned upstream of the medium flow meter 110 and configured to regulate the flow of gas through the medium flow meter 110 is closed, thereby blocking gas flow through the medium flow meter 110. Similarly, a selection valve 128 positioned upstream of the second small flow meter 124 and configured to regulate the flow of gas through the second flow meter 124 is closed, thereby blocking gas flow through the second small flow meter 124. Consequently, gas flowing from the fuel storage 12 and through the custody transfer skid 14 will pass through the first small flow meter 122 to the proving meters 104, as indicated by arrows 130, but not through the medium flow meter 110 and the second small flow meter 124. As the gas flows through the first small slow meter 122, the first small flow meter 122 will measure the flow rate of the gas passing from the fuel storage 12 to the proving meters 104.

After the gas flow passes through the first small flow meter 122, the gas flow will pass through a first large flow meter 132 (e.g., proving meter 104). A selection valve 134 associated with the first large flow meter 132 is disposed upstream of the first large flow meter 132 and is configured to regulate gas flow through the first large flow meter 132. In the illustrated embodiment, the selection valve 134 is in an open position, thereby allowing gas to flow through the first large flow meter 132. Conversely, a selection valve 136 associated with a second large flow meter 138 (e.g., proving meter 104) is in a closed position. In other words, the selection valve 136 positioned upstream of the second large flow meter 138 and configured to regulate gas flow through the second large flow meter 138 is closed to block gas flow through the second large flow meter 138. Consequently, gas flowing from the custody transfer meters 102 (e.g., the first small flow meter 122) will pass through the first large flow meter 132, as indicated by arrow 140, but not the second large flow meter 138. As the gas flows through the first large slow meter 132, the first large flow meter 132 will measure the flow rate of the gas passing from the custody transfer meters 102 to the gas turbines 16. After the gas flows through the proving meters 104 (e.g., the first large flow meter 132), the gas flows through the gas flow outlet 105 and to the gas turbines 16 in operation (e.g., one gas turbine 16). As discussed above, the flow computer 44 may compare the gas flow measurements of the first small flow meter 122 (e.g., custody transfer meter 102) and the first large flow meter 132 (e.g., proving meter 104) to verify accuracy of the gas flow measurements of the custody transfer skid 14.

Figure 6:
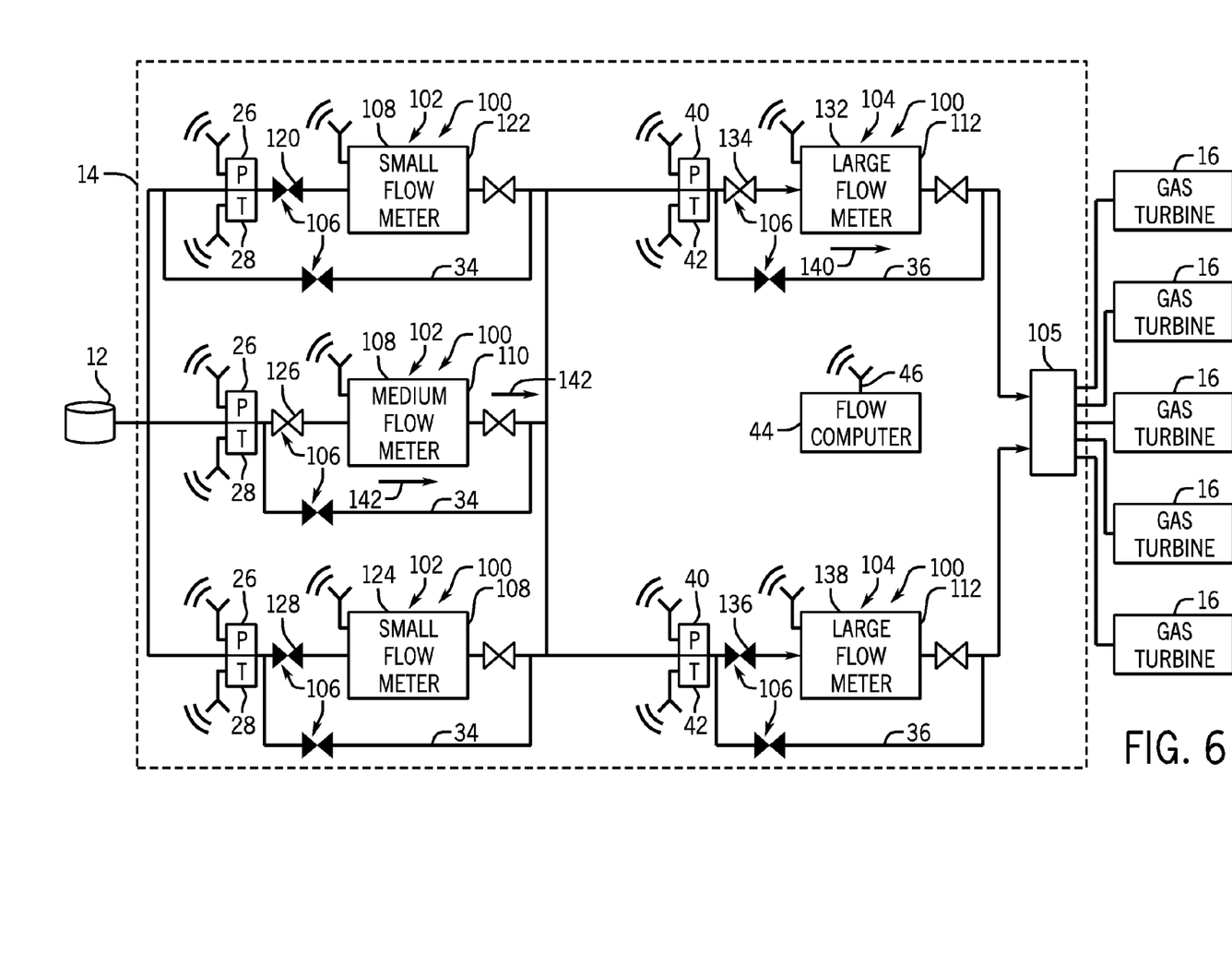
FIG. 6 is a schematic diagram of the gas turbine system with the custody transfer skid having multiple flow meters operating in parallel and in series, illustrating usage of the flow meters when two gas turbines are operating.

FIG. 6 is a schematic diagram of the gas turbine system 10 with the custody transfer skid 14 having multiple flow meters 100 operating in parallel and in series, illustrating usage of the flow meters 100 when two gas turbines 16 are operating. As similarly discussed above, certain selection valves 106 are closed to block gas flow to certain flow meters 100 of the custody transfer skid 14, while other selection valves 106 are open to allow other flow meters 100 to receive gas flow from the fuel storage 12. In this manner, the amount of gas flowing through the custody transfer skid 14 (e.g., gas flow rate) can be tailored or adjusted based on the number of gas turbines 16 in operation. As a result, the gas flow rate measurement accuracy of the flow meters 100 and the custody transfer skid 14 may be improved. While the embodiment of the custody transfer skid 14 shown in FIG. 5 is configured to flow gas for one operating gas turbine 16, the embodiment of the custody transfer skid 14 shown in FIG. 6 is configured to flow gas for two operating gas turbines 16. As a result, the custody transfer skid 14 shown in FIG. 6 is configured to flow more gas (i.e., flow gas at a higher flow rate) than the custody transfer skid 14 shown in FIG. 5, as described below.

As mentioned above, when passing through the custody transfer skid 14 from the fuel storage 12 to the gas turbines 16, the gas first flows through one or more custody transfer meters 102 and then subsequently flows through one or more proving meters 104. In the illustrated embodiment, the selection valve 120 associated with the first small flow meter 122 (e.g., custody transfer meter 102) is in a closed position, the selection valve 126 associated with the medium flow meter 110 is in an open position, and the selection valve 128 associated with the second small flow meter 124 is in a closed position. Consequently, the gas will flow from the fuel storage 12, through the medium flow meter 110, as indicated by arrows 142, and to the proving meters 104. The gas will not flow through the first and second small flow meters 122 and 124 because the respective selection valves 106 associated with the first and second small flow meters 122 and 124 are closed and, thus, block the gas from flowing through the small flow meters 122 and 124.

After the gas flow passes through the medium flow meter 110, the gas flow will pass through the first large flow meter 132 (e.g., proving meter 104). That is, the selection valve 134 is in an open position, thereby allowing gas to flow through the first large flow meter 132. Conversely, the selection valve 136 associated with the second large flow meter 138 (e.g., proving meter 104) is in a closed position, thereby blocking gas flow through the second large flow meter 138. Consequently, gas flowing from the custody transfer meters 102 (e.g., the medium flow meter 110) will pass through the first large flow meter 132, as indicated by arrow 140, but not the second large flow meter 138. As the gas flows through the first large slow meter 132, the first large flow meter 132 will measure the flow rate of the gas passing from the custody transfer meters 102 to the gas turbines 16. After the gas flows through the proving meters 104 (e.g., the first large flow meter 132), the gas flows through the gas flow outlet 105 and to the gas turbines 16 in operation (e.g., two gas turbines 16). As discussed above, the flow computer 44 may compare the gas flow measurements of the medium flow meter 110 (e.g., custody transfer meter 102) and the first large flow meter 132 (e.g., proving meter 104) to verify accuracy of the gas flow measurements of the custody transfer skid 14.

Figure 7:
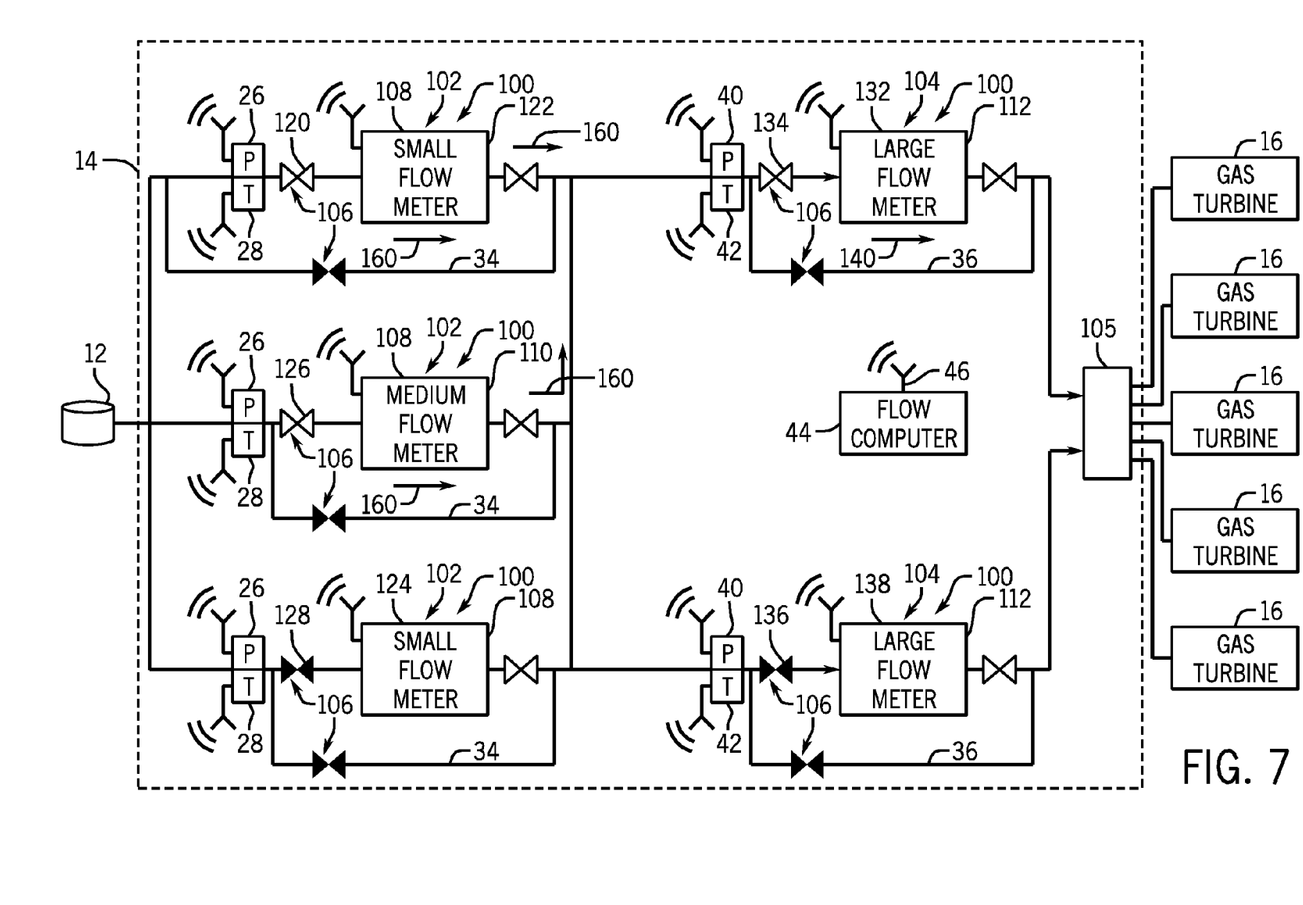
FIG. 7 is a schematic diagram of the gas turbine system with the custody transfer skid having multiple flow meters operating in parallel and in series, illustrating usage of the flow meters when three gas turbines are operating.

FIG. 7 is a schematic diagram of the gas turbine system 10 with the custody transfer skid 14 having multiple flow meters 100 operating in parallel and in series, illustrating usage of the flow meters 100 when three gas turbines 16 are operating. As similarly discussed above, certain selection valves 106 are closed to block gas flow to certain flow meters 100 of the custody transfer skid 14, while other selection valves 106 are open to allow other flow meters 100 to receive gas flow from the fuel storage 12. In this manner, the amount of gas flowing through the custody transfer skid 14 (e.g., gas flow rate) can be tailored or adjusted based on the number of gas turbines 16 in operation. As a result, the gas flow rate measurement accuracy of the flow meters 100 and the custody transfer skid 14 may be improved. While the embodiment of the custody transfer skid 14 shown in FIG. 6 was configured to flow gas for two operating gas turbines 16, the embodiment of the custody transfer skid 14 shown in FIG. 7 is configured to flow gas for three operating gas turbines 16. As a result, the custody transfer skid 14 shown in FIG. 7 is configured to flow more gas (i.e., flow gas at a higher flow rate) than the custody transfer skid 14 shown in FIG. 6, as described below.

As mentioned above, when passing through the custody transfer skid 14 from the fuel storage 12 to the gas turbines 16, the gas first flows through one or more custody transfer meters 102 and then subsequently flows through one or more proving meters 104. In the illustrated embodiment, the selection valve 120 associated with the first small flow meter 122 (e.g., custody transfer meter 102) is in an open position, the selection valve 126 associated with the medium flow meter 110 is in an open position, and the selection valve 128 associated with the second small flow meter 124 is in a closed position. Consequently, the gas will flow from the fuel storage 12, through the first small flow meter 122 and/or the medium flow meter 110, as indicated by arrows 160, and then to the proving meters 104. The gas will not flow through the second small flow meter 124 because the selection valves 128 associated with the second small flow meter 124 is closed and, thus, blocks the gas from flowing through the first small flow meter 122.

After the gas flow passes through the first small flow meter 122 and/or the medium flow meter 110, the gas flow will pass through the first large flow meter 132 (e.g., proving meter 104). That is, the selection valve 134 is in an open position, thereby allowing gas to flow through the first large flow meter 132. Conversely, the selection valve 136 associated with the second large flow meter 138 (e.g., proving meter 104) is in a closed position, thereby blocking gas flow through the second large flow meter 138. Consequently, gas flowing from the custody transfer meters 102 (e.g., the first small flow meter 122 and the medium flow meter 110) will pass through the first large flow meter 132, as indicated by arrow 140, but not the second large flow meter 138. As the gas flows through the first large slow meter 132, the first large flow meter 132 will measure the flow rate of the gas passing from the custody transfer meters 102 to the gas turbines 16. After the gas flows through the proving meters 104 (e.g., the first large flow meter 132), the gas flows through the gas flow outlet 105 and to the gas turbines 16 in operation (e.g., three gas turbines 16). As discussed above, the flow computer 44 may compare the cumulative gas flow measurements of the first small flow meter 122 and the medium flow meter 110 (e.g., custody transfer meters 102) and the first large flow meter 132 (e.g., proving meter 104) to verify accuracy of the gas flow measurements of the custody transfer skid 14.

Figure 8:
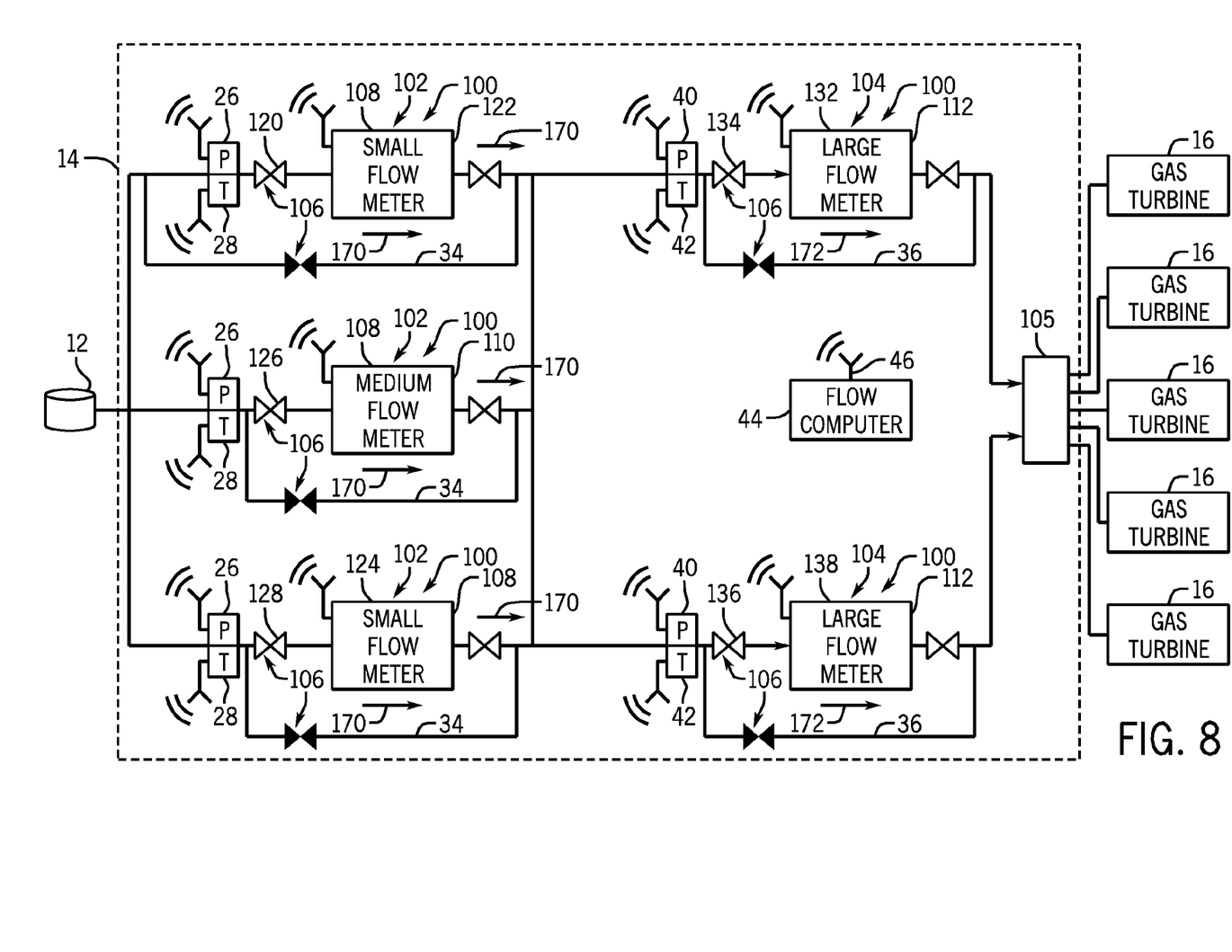
FIG. 8 is a schematic diagram of the gas turbine system with the custody transfer skid having multiple flow meters operating in parallel and in series, illustrating usage of the flow meters when four or five gas turbine are operating.

FIG. 8 is a schematic diagram of the gas turbine system 10 with the custody transfer skid 14 having multiple flow meters 100 operating in parallel and in series, illustrating usage of the flow meters 100 when four or five gas turbines 16 are operating. In the illustrated embodiment, all selection valves 106 associated with respective flow meters 100 are open, thereby allowing gas to flow through each of the flow meters 100. In this manner, the amount of gas flowing through the custody transfer skid 14 (e.g., gas flow rate) is tailored or adjusted based on the number of gas turbines 16 in operation. As a result, the gas flow rate measurement accuracy of the flow meters 100 and the custody transfer skid 14 may be improved. While the embodiment of the custody transfer skid 14 shown in FIG. 7 was configured to flow gas for three operating gas turbines 16, the embodiment of the custody transfer skid 14 shown in FIG. 8 is configured to flow gas for four or five operating gas turbines 16. As a result, the custody transfer skid 14 shown in FIG. 8 is configured to flow more gas (i.e., flow gas at a higher flow rate) than the custody transfer skid 14 shown in FIG. 7, as described below.

As mentioned above, when passing through the custody transfer skid 14 from the fuel storage 12 to the gas turbines 16, the gas first flows through one or more custody transfer meters 102 and then subsequently flows through one or more proving meters 104. As mentioned above, in the illustrated embodiment, the selection valve 120 associated with the first small flow meter 122 (e.g., custody transfer meter 102) is in an open position, the selection valve 126 associated with the medium flow meter 110 is in an open position, and the selection valve 128 associated with the second small flow meter 124 is in an open position. Consequently, the gas will flow from the fuel storage 12, through the first small flow meter 122, the medium flow meter 110, and/or the second small flow meter 124, as indicated by arrows 170, and then to the proving meters 104.

After the gas flow passes through the first small flow meter 122, the medium flow meter 110, and/or the second small flow meter 124, the gas flow will pass through the first large flow meter 132 and/or the second large flow meter 138 (e.g., proving meters 104). That is, the selection valves 134 and 136 are in open positions, thereby allowing gas to flow through the first large flow meter 132 and/or the second large flow meter 138, respectively. Consequently, gas flowing from the custody transfer meters 102 (e.g., the first small flow meter 122, the medium flow meter 110, and the second small flow meter 124) will pass through the first large flow meter 132 and/or the second large flow meter 138, as indicated by arrows 172. As the gas flows through the first large slow meter 132 and/or the second large flow meter 138, the first and second large flow meter 132 and 138 will measure the flow rate of the gas passing from the custody transfer meters 102 to the gas turbines 16. After the gas flows through the proving meters 104 (e.g., the first and second large flow meter 132 and 138), the gas flows through the gas flow outlet 105 and to the gas turbines 16 in operation (e.g., four or five gas turbines 16). As discussed above, the flow computer 44 may compare the cumulative gas flow measurements of the first small flow meter 122, the medium flow meter 110, and the second small flow meter 124 (e.g., custody transfer meters 102) and the cumulative gas flow measurements of the first and second large flow meter 132 and 138 (e.g., proving meters 104) to verify accuracy of the gas flow measurements of the custody transfer skid 14.

Technical effects of the invention include a custody transfer skid that is enabled to make more accurate custody transfer quantity measurements for one or more gas turbines. More specifically, the custody transfer skid has a plurality of flow meters (e.g., custody transfer meters and proving meters), the usage of which may be customized or tailored to regulate the gas flow through the custody transfer skid depending on the number gas turbines in operation at a given time. For example, in low flow situations (e.g., when fewer gas turbines are in operation), smaller flow meters may provide increased accuracy over larger flow meters. By providing multiple smaller flow meters, different quantities of gas may flow through the custody transfer skid depending on the number of smaller flow meters in use, while increasing the accuracy of the flow measurements. Further, by utilizing a plurality of flow meters, there may be increased redundancy, such that one or more flow meters may be taken offline while the custody transfer skid is still enabled to pass a gas supply to downstream components, such as a gas turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a custody transfer system configured to transfer a gas fuel from a gas supply to a plurality of gas turbines, comprising:
a first plurality of flow meters arranged in parallel with each other, wherein each of the first plurality of flow meters is configured to obtain a first measurement of a portion of a flow rate of the gas fuel flowing through the custody transfer system; and
a second plurality of flow meters in series with the first plurality of flow meters, wherein each of the second plurality of flow meters is configured to obtain a second measurement of the flow rate of the gas fuel flowing through the custody transfer system,
wherein each of the first and second plurality of flow meters is configured to be blocked or unblocked from receiving the gas fuel based on a number of the plurality of gas turbines in operation.

2. The system of claim 1, wherein the first plurality of flow meters and the second plurality of flow meters comprise a Coriolis flow meter, an ultrasonic flow meter, a turbine meter, a Venturi flow meter, an orifice flow meter, or a combination thereof.

3. The system of claim 1, wherein each of the first and second pluralities of flow meters comprises a respective selection valve, wherein each selection valve is configured to be opened or closed based on the number of the plurality of gas turbines in operation.

4. The system of claim 1, wherein each of the first plurality of flow meters has a first maximum flow rate, each of the second plurality of flow meters has a second maximum flow rate, and a first summation of the first maximum flow rates of the first plurality of flow meters is generally equal to a second summation of the second maximum flow rates of the second plurality of flow meters.

5. The system of claim 1, comprising a first bypass passage for each of the first plurality of flow meters and a second bypass passage for each of the second plurality of flow meters, wherein each first bypass passage is configured to enable the gas fuel to flow without flowing through the respective flow meter of the first plurality of flow meters, and each second bypass passage is configured to enable the gas fuel to flow without flowing through the respective flow meter of the second plurality of flow meters.

6. The system of claim 1, comprising a flow computer configured to:
obtain a first summed flow measurement by summing the first measurements of the first plurality of flow meters;
obtain a second summed flow measurement by summing the second measurements of the second plurality of flow meters;
determine a custody transfer calculation representing an amount of gas fuel transferred through the custody transfer system based at least in part upon the first summed flow measurement and the second summed flow measurement.

7. The system of claim 6, wherein the flow computer is configured to operate a respective selection valve of each of the first and second pluralities of flow meters based on the number of the plurality of gas turbines in operation, and each selection valve is configured to block or unblock the gas fuel from flowing through the respective flow meter of each of the first and second pluralities of flow meters.

8. The system of claim 1, wherein the first plurality of flow meters comprises a first flow meter, a second flow meter, and a third flow meter, wherein the first and second flow meters each have a flow capacity smaller than a flow capacity of the third flow meter.

9. The system of claim 8, wherein the second plurality of flow meters comprises a fourth flow meter and a fifth flow meter, and the fourth and fifth flow meters each have a flow capacity larger than the flow capacity of the third flow meter of the first plurality of flow meters.

10. The system of claim 9, wherein the cumulative flow capacity of the first plurality of flow meters is less than or equal to the cumulative flow capacity of the second plurality of flow meters.

11. A system, comprising:
a custody transfer system configured to supply a gas fuel to a plurality of gas turbines, comprising:
a first plurality of flow meters configured to flow the gas fuel, each of the first plurality of flow meters having a respective first selection valve configured to regulate flow of the gas fuel through the respective flow meter of the first plurality of flow meters, wherein the first plurality of flow meters are arranged in parallel with one another;
a second plurality of flow meters configured to flow a gas fuel, each of the second plurality of flow meters having a second respective selection valve configured to regulate flow of the gas fuel through the respective flow meter of the second plurality of flow meters, wherein the second plurality of flow meters are arranged in parallel with one another, and the first plurality and the second plurality of flow meters are arranged in series with one another; and
a flow computer configured to operate the first selection valves of the first plurality of flow meters and the second selection valves of the second plurality of flow meters based upon a number of the plurality of gas turbines in operation.

12. The system of claim 11, wherein the first plurality of flow meters comprises a first flow meter, a second flow meter, and a third flow meter, wherein the third flow meter has a flow capacity larger than a flow capacity of each of the first and second flow meters.

13. The system of claim 12, wherein the second plurality of flow meters comprises a fourth flow meter and a fifth flow meter, and the fourth and fifth flow meters each have a flow capacity larger than a flow capacity of the third flow meter of the first plurality of flow meters.

14. The system of claim 11, wherein the flow computer is configured to sum flow measurements of the first plurality of flow meters to generate a first summation, sum flow measurements of the second plurality of flow meters to generate a second summation, and compare the first and second summations to verify gas flow through the custody transfer system.

15. The system of claim 11, wherein the custody transfer system comprises a first bypass passage for each of the first plurality of flow meters and a second bypass passage for each of the second plurality of flow meters, wherein each first bypass passage is configured to enable the gas fuel to flow without flowing through the respective flow meter of the first plurality of flow meters, and each second bypass passage is configured to enable the gas fuel to flow without flowing through the respective flow meter of the second plurality of flow meters.

16. The system of claim 11, comprising the plurality of gas turbines.

17. A method, comprising:
regulating, via a computer, flow of a gas fuel through a first plurality of flow meters of a custody transfer system based upon a number of gas turbines in operation, wherein the first plurality of flow meters are arranged in parallel with one another;

regulating, via the computer, flow of the gas fuel through a second plurality of flow meters of the custody transfer system based upon the number of gas turbines in operation, wherein the second plurality of flow meters are arranged in parallel with one another, and the first plurality of flow meters and the second plurality of flow meters are arranged in series with each other.

18. The method of claim 17, wherein regulating flow of the gas through the first and second pluralities of flow meters comprises operating a plurality of selection valves, wherein each of the plurality of selection valves is configured to regulate flow of the gas through a respective flow meter of the first or second pluralities of flow meters.

19. The method of claim 18, wherein operating the plurality of selection valves comprises opening or closing one of the plurality of selection valves in response to a change in the number of gas turbines in operation.

20. The method of claim 19, comprising:
summing, via the computer, flow measurements of the first plurality of flow meters to generate a first summation;
summing, via the computer, flow measurements of the second plurality of flow meters to generate a second summation; and
comparing, via the computer, the first and second summations to verify the amount of gas fuel transferred by the custody transfer system.

* * * * *